C. VAN BERGH.
THRESHING MACHINE.
APPLICATION FILED NOV. 3, 1910.
1,000,056.
Patented Aug. 8, 1911.
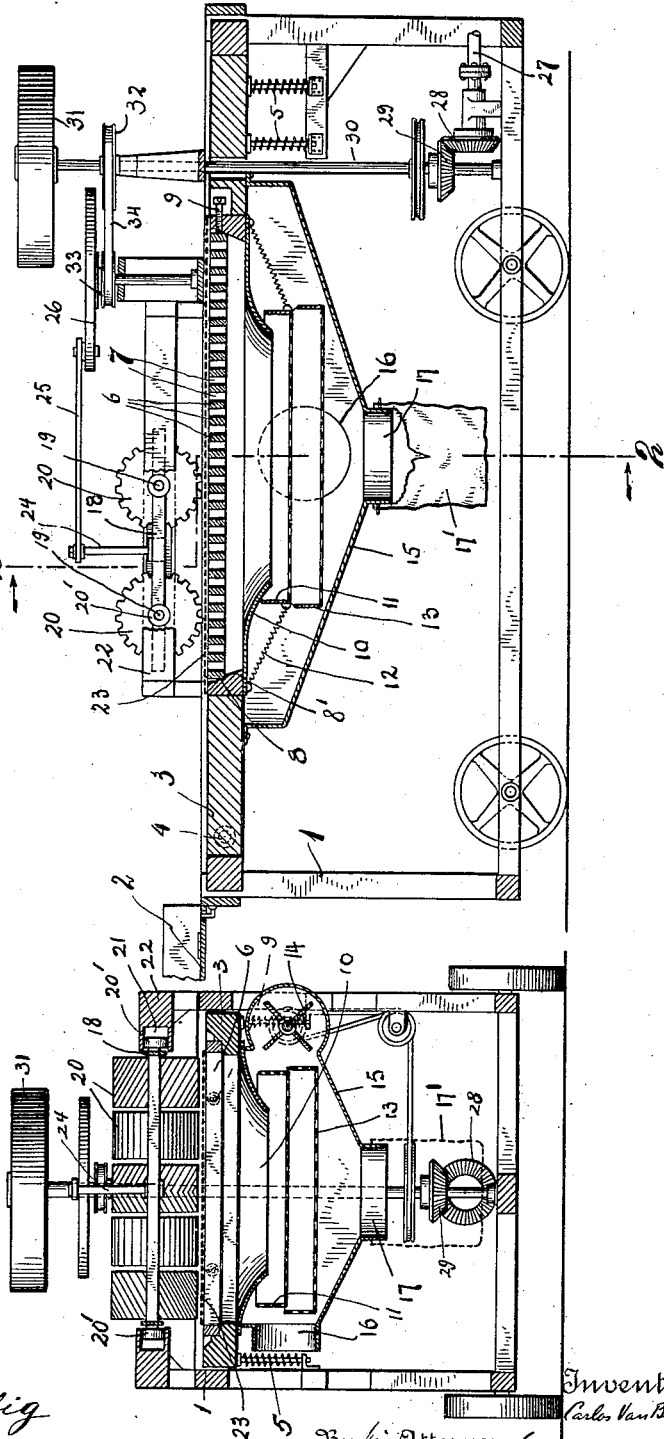
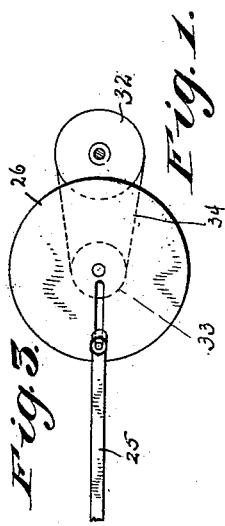

UNITED STATES PATENT OFFICE.

CARLOS VAN BERGH, OF WEST NYACK, NEW YORK.

THRESHING-MACHINE.

1,000,056.     Specification of Letters Patent.     Patented Aug. 8, 1911.

Application filed November 3, 1910. Serial No. 590,476.

*To all whom it may concern:*

Be it known that I, CARLOS VAN BERGH, citizen of the Dominion of Canada, residing at West Nyack, in the county of Rockland and State of New York, have invented certain new and useful Improvements in Threshing-Machines, of which the following is a specification.

The present invention relates to threshing machines and has for its object to provide a threshing machine, which, in accordance with the kind of grain to be treated thereon, can be adjusted so as not to unnecessarily affect the straw.

Furthermore, my object is to provide a machine of great efficiency and simple construction.

With these objects in view, my invention consists in the construction, arrangement and combination of parts as will be hereinafter described and claimed.

My invention is illustrated in the accompanying drawing, in which similar reference letters denote corresponding parts and in which—

Figure 1 is a vertical section of the machine, Fig. 2 a cross section on line 2—2 of Fig. 1 and Fig. 3 a plan view of a detail.

With reference to the drawing, which forms a part of this specification, 1 denotes the wheeled frame of the machine and 2 the feed board.

3 denotes the working base or field. This base is at one end as at 4 pivotally connected to the frame of the machine and on its opposite end supported on springs 5, owing to which the base is capable of yielding when it becomes crowded with straw, etc., as will be hereinafter shown. The base is formed as a rectangular frame, the free space of which is filled in by a plurality of slats 6 arranged alongside and at such a distance apart from one another, as at 7, as is necessary to allow only the threshed grain to fall through. The spacing may be regulated by suitable layers interposed between said slats. To support the slats in their position, the frame is provided with inwardly projecting flanges 8. Below these flanges the edges may have an inwardly directed slant 8', whereby accumulating grain may be directed downward. The slats may be secured in relative position to each other by pressure screws 9.

Fixed to the bottom of the frame 3 is a funnel or chute 10 which terminates into a shaking sieve 11 suspended by springs 12 from the frame. This sieve carries a second sieve 13 of finer web.

14 denotes a fan arranged in the funnel-shaped housing 15 inclosing the sieves 11, 13 and having an exhaust 16. This fan, which may consist of two crosswise arranged frames covered with a fabric, as muslin or the like, is adapted to blow out the impurities accumulating in the sieves and the ears, hulls, chaff, etc., before the same reach the sieves. To the mouth 17 of the funnel 16 the receptacle 17', adapted to receive the threshed grain, may be attached.

The threshing mechanism proper consists of a frame 18 of suitable material, in which two or more spindles 19 are journaled. Each spindle carries a set of disks or wheels 20, which on their circumferences are furrowed or formed with tooth-like projections arranged in various directions. According to the particular function desired, said wheels may be either all stationary or loose on their spindles or some of them may be fixed and some loose. The wheels of the several sets are arranged only so far from one another as not to interfere with one another while in operation. The ends of the spindles 19 project outward from the frame 18 and carry rollers 20', whereby they movably engage guide grooves 21 provided in rails 22. These rails extend crosswise to the slats and project beyond the latter from the frame of the machine. The width of the frame 18 conforms to that occupied by the slats in the frame 3.

Stretched over the slats is a netting 23. The wheels 20 extend with their circumferences down to the netting 23 without, however, coming in contact therewith.

The frame 18 is attached to an arm 24, which is secured to a lever 25. The latter is adjustably connected to a rotary disk 26, so as to impart a reciprocating movement to the arm 24 and consequently the frame 18, the stroke of which movement, according to the adjustment of the lever 25, may be varied. This is one of the main features of my invention. It is well known that with some grain, as rye, for instance, the grain is generally distributed uniformly in the ends of the long straw. The threshing of such wheat would require only the ears of the straw carrying the grain being placed under the wheels, while the rest of the straw can be saved from being mutilated by the wheels and thus kept in good condition for the market. The threshing floor in this case can, therefore, be shortened, which is accomplished by adjusting the lever 25, so that its stroke and that of the frame 18 is the shortest. On the other hand, barley, oats, wheat, etc., are non-uniformly distributed in the straw. In such cases, the stroke of the frame must be longer. With peas, beans, lentil, etc., the threshing floor must be the largest. By the constant to and fro movement of the frame 18 and rolling of the wheels 20 over the ears containing the grain, the threshing is effected in a most efficient manner, without destroying the straw.

When, during the threshing operation between the wheels 20 and the base or slats, a great quantity of straw and other matter accumulates, the base will automatically yield without causing any disturbance in the working of the machine.

Rotation is imparted to the disk 26 from a suitable source of power, by means of a shaft 27, which through suitable gears 28, 29 transmits movement to a shaft 30 carrying a fly wheel 31. The shaft 30 transmits its movement to the disk 26 by suitable transmission means, as pulleys 32, 33 and belt 34 or the like. Movement to the fan may also be transmitted from the shaft 30 by suitable means, as pulleys and belt or the like.

Having thus described the nature of my invention, what I claim and desire to secure by Letters Patent is:

1. In a threshing machine, a base provided with spaced bars forming a threshing floor, means for pivotally supporting the same at one side and for yieldingly supporting the same at the other side, a plurality of threshing cylinders and means for reciprocating said cylinders over said floor.

2. In a threshing machine, a base provided with spaced bars forming a threshing floor, a screen over said threshing floor, means for pivotally supporting the said base at one side and for yieldingly supporting the same at the other side, a plurality of threshing cylinders and means for reciprocating said cylinders over said floor.

3. In a threshing machine, a base provided with spaced bars forming a threshing floor, means for pivotally supporting the same at one side and for yieldingly supporting the same at the other side, a plurality of threshing cylinders the peripheries of which are ribbed or furrowed at different angles and means for reciprocating said cylinders over said floor.

In testimony whereof I affix my signature in presence of two witnesses.

CARLOS VAN BERGH.

Witnesses:
 CARL TAUSIG,
 LOUIS STEIN.

Copies of this patent may be obtained for five cents each, by addressing the " Commissioner of Patents, Washington, D. C."